(12) United States Patent
Skalecki et al.

(10) Patent No.: US 9,118,605 B2
(45) Date of Patent: *Aug. 25, 2015

(54) LINK BUNDLE CO-ROUTED VCAT VIA RSVP MESSAGE BUNDLING

(71) Applicant: RPX Clearinghouse LLC, San Francisco, CA (US)

(72) Inventors: Darek Skalecki, Kanata (CA); Evelyne Roch, Pontiac (CA)

(73) Assignee: RPX CLEARINGHOUSE LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/084,376

(22) Filed: Nov. 19, 2013

(65) Prior Publication Data

US 2014/0078901 A1 Mar. 20, 2014

Related U.S. Application Data

(63) Continuation of application No. 13/098,270, filed on Apr. 29, 2011, now Pat. No. 8,593,961, which is a continuation of application No. 12/394,405, filed on Feb. 27, 2009, now Pat. No. 7,948,885.

(60) Provisional application No. 61/032,164, filed on Feb. 28, 2008.

(51) Int. Cl.
*H04L 12/913* (2013.01)
*H04L 12/701* (2013.01)
*H04L 12/709* (2013.01)
*H04L 12/911* (2013.01)

(52) U.S. Cl.
CPC .............. *H04L 47/724* (2013.01); *H04L 45/00* (2013.01); *H04L 45/245* (2013.01); *H04L 47/746* (2013.01); *H04L 47/825* (2013.01); *H04L 47/827* (2013.01); *Y02B 60/33* (2013.01)

(58) Field of Classification Search
None
See application file for complete search history.

(56) References Cited

U.S. PATENT DOCUMENTS

| 7,319,700 | B1 * | 1/2008 | Kompella | 370/400 |
| 7,948,885 | B1 * | 5/2011 | Skalecki et al. | 370/231 |
| 8,593,961 | B2 * | 11/2013 | Skalecki et al. | 370/231 |
| 2002/0024941 | A1 * | 2/2002 | Lee et al. | 370/331 |
| 2002/0026525 | A1 * | 2/2002 | Armitage | 709/238 |

* cited by examiner

*Primary Examiner* — Chi H Pham
*Assistant Examiner* — Shick Hom
(74) *Attorney, Agent, or Firm* — Anderson Gorecki & Rouille LLP (57) ABSTRACT

Multiple RSVP messages are used to separately signal components of co-routed VCAT to enable the separate components to be implemented on different physical fibers of a link bundle. To enable the PATH messages to be handled as a group, the multiple PATH messages are grouped together and sent out in a RSVP bundle message. When a RSVP bundle message containing multiple PATH messages is received at a network element, such as an ENNI, where the route for the PATH messages needs to be expanded, the route is expanded collectively and the expanded route is inserted into each individual PATH message. The modified PATH messages are then passed through the RSVP finite state machine one at a time to enable resources to be reserved for the connections of the VCAT. Thus, a single LSP may be created for each channel, and channels may be co-routed even where route expansion is required.

20 Claims, 5 Drawing Sheets

Figure 1

Legend
10: Network
12: Network Element
14: Links
16: VCAT Connection

Figure 2

Legend
10: Network
12: Network Element

Figure 3

Legend
10: Network
12: Network Element

Figure 4

Legend
10: Network
12: Network Element

Figure 5

Legend
10: Network
12: Network Element

LINK BUNDLE CO-ROUTED VCAT VIA RSVP MESSAGE BUNDLING

CROSS-REFERENCE TO RELATED APPLICATIONS

This application is a continuation of U.S. patent application Ser. No. 13/098,270, filed Apr. 29, 2011, now U.S. Pat. No. 8,593,961 which is a continuation of U.S. patent application Ser. No. 12/394,405, filed Feb. 27, 2009, now U.S. Pat. No. 7,948,885, which claims priority to U.S. Provisional Patent Application Ser. No. 61/032,164 filed Feb. 28, 2008, the content of each of which is hereby incorporated herein by reference.

TECHNICAL FIELD

The present invention relates to communication networks and, more particularly, to a method and apparatus for enabling virtually concatenated channels to be co-routed on separate physical fibers of a link bundle over a communication network.

BACKGROUND

Data communication networks may include various switches, routers, hubs, and other devices coupled to and configured to receive data and forward the data on the network. These devices will be referred to herein as "network elements." A network element is generally not a consumer of the data, but rather is used to receive and forward data so that the data may pass through the network. Data is communicated through a network by enabling the network elements to pass protocol data units, such as frames, packets, cells or segments, between each other over communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements.

In optical networks such as SONET networks, a connection will be established before data is allowed to be passed over the optical network. The connections are provisioned through the network so that a particular service instance will be connected between ports on network elements and remain provisioned over those ports until the provisioning is changed or shut down. For example, once the optical network elements are interconnected by optical fibers, a network manager will log into an optical service provisioning system to set up data connections (services) through the network elements and optical fibers.

Optical services are offered in blocks of bandwidth of a particular size (channels). For example, on a SONET network an STS-1 provides 50 Mb of bandwidth, an STS-3c provides 150 Mb of bandwidth, and an STS-12c provides 600 Mb of bandwidth. Where Gigabit Ethernet is to be transported over a SONET network, the Gigabit Ethernet service is too large to be carried on an STS-12c. Unfortunately, the next larger size (STS-48c) offers 2.5 Gb, which is much larger than necessary to carry the 1 Gigabit Ethernet service. Similar channel sizes are offered in SDH networks prevalent in regions outside of North America.

As Ethernet services become more prevalent, the need to accommodate transmission channels of different sizes caused an extension to the SONET standard to be adopted which is commonly referred to as Virtual Concatenation, or VCAT for short. VCAT enables multiple smaller channels (i.e. STS-1s or STS-3c's) to be grouped together logically to form a larger channel through the SONET network. Keeping with the Gigabit Ethernet example, 21 STS-1s may be concatenated together to create a channel through the optical network with approximately 1 Gb of bandwidth. Alternatively, 7 STS-3c's may be concatenated together to create the same sized channel. One restriction imposed by VCAT is that all channels that are grouped together must be of the same size. Thus, for example, it is not possible to concatenate a STS-12 with a STS-3.

When multiple STS-1s or STS-3c's are concatenated together, the STS-1s or STS-3c's channels are actually separate time slots that may be reserved on the same or different physical fibers of the network. In operation, the data that is to be carried on the virtually concatenated channels will be multiplexed onto the individual channels (time slots) to be transported on the SONET network and then de-multiplexed at the other end.

The fact that multiple individual channels are transporting pieces of a common data stream places some requirements as to how the individual channels are created on the network. Specifically, since the multiple channels are actually time slots that each carry pieces of a common dataset, the delay between the multiple channels should be approximately the same so that the data does not arrive out of order at the far end of the network. If the delay on one of the channels is significantly longer than the delay of the other channels, the data from the other channels will need to be buffered while waiting for the data from the slower channel.

Accordingly, it is common to try to implement the channels so that they follow paths through the network that have similar delay characteristics, such that the delay between each of the virtually concatenated channels is approximately equal. While the connections do not need to go through the same path, to minimize the amount of delay difference between the channels ideally the channels should follow the same path and use the same physical links through the network.

Internet Engineering Task Force (IETF) Request For Comments (RFC) 4606 provides details about signaling VCAT on a SONET network using ReSerVation Protocol (RSVP), which enables MultiProtocol Label Switching (MPLS) Label Switched Paths (LSPs) to be set up across the SONET network so that multiple STS-1s (or STS-3c's) may be used to implement the concatenated connection. In GMPLS, Open Shortest Path First (OSPF) is commonly used as the routing protocol in the control plane. Nodes on the network advertise adjacencies with other nodes using link state advertisements. The nodes use the advertisements to build a topology database which may be used to route connections through the network. For scalability purposes, where a node has multiple physical links interconnecting itself with a neighboring node, the node will often summarize the multiple physical links into a single routing entry and advertise the link bundle, rather than advertising the individual links.

Links are only bundled where they have the same characteristics including propagation and delay characteristics. Thus, since VCAT enables different connections to be carried by different physical fibers as long as the delay characteristics are similar, it should be possible for different concatenated connections to use different fibers of a bundled link.

Unfortunately, RSVP, which is used to signal connections on GMPLS networks, does not support establishment of multiple VCAT related connections on different physical links between nodes, even if the links are part of a link bundle.

When RSVP is used to signal a connection on the network, it creates a Label Switched Path (LSP) through the network which is a finite state machine. The finite state machine controls the data plane of the network element to cause the data plane to establish the physical connectivity through the network. Succinctly, once the OSPF database has been consulted and a route for a connection has been determined, an RSVP "PATH" message is sent out on the network. The PATH message causes the resources to be reserved by the control plane of each node along the route through the network. Once the PATH message has reached the destination, a second RSVP message is sent back along the connection to cause the control plane to program the connection into the data plane at each node. This message is referred to as a "RESV" message. A node that generates the PATH message will be referred to herein as the "head-end node".

Where the PATH message refers to multiple concatenated STS-1s (or STS-3c's), the nodes along the route will reserve multiple time slots on the same physical fiber. When the RESV message is received, the node will then program the data plane to implement the resource reservation. Thus, in this instance, a single Label Switched Path finite state machine (at each node) will control the concatenated reserved bandwidth for the connection at that node. Upon failure of the fiber or other data plane failure, the finite state machine can trigger the connection to failover to a new connection, since all of the VCAT connections are on the same fiber, the finite state machine can control failover of all of the data plane connections.

While the one finite state machine can control the multiple physical connections if the connections are all on the same fiber, the one finite state machine does not work well where the multiple connections are implemented on different physical fibers in the data plane. For example, the multiple different physical connections may go down at different times, etc., which makes it difficult for the one finite state machine to manage failover of multiple STS-1s (or STS-3c's) on multiple physical connections.

RSVP also can be used to separately signal each connection of a VCAT, which would enable the different connections to use different links of a link bundle. A problem arises, however, when the connections are required to traverse a network domain boundary where the route is required to be expanded. Typically, routing information for a domain is abstracted at network domain boundaries, which prevents the head-end node from calculating the entire route for the path through the network. While the head-end node will have routing information for its own domain, it will not have sufficient routing information for neighboring domains to calculate routes through those domains. Thus, when a PATH message is received at the ingress to a neighboring domain, the External Network to Network Interface (E-NNI) at the ingress to that domain will calculate a route for the connection through the neighboring domain. This is commonly referred to as route expansion. If PATH messages for separate connections of a VCAT are processed by the E-NNI separately, the E-NNI may perform route expansion differently for the related connections which means that there is no guarantee that the different connections will follow the same path through the neighboring domain. Accordingly, it would be advantageous to provide a way to ensure that multiple virtually concatenated channels are co-routed through the network even when route expansion is required to be performed on the connections.

SUMMARY OF THE INVENTION

Multiple RSVP messages are used to individually signal connections of a virtually concatenated connection on the GMPLS network. Each of the multiple RSVP messages results in establishment of a separate LSP, each of which may utilize any physical link of a link bundle so that the multiple connections of the VCAT may be established over multiple equivalent physical links.

To enable the PATH messages to be handled as a group, according to an embodiment of the invention, the multiple PATH messages are grouped together and sent out in a RSVP bundle message. When a node receives a RSVP bundle message containing multiple PATH messages, the node will extract the multiple PATH messages and process the PATH messages one at a time to reserve resources on the physical fibers of the link bundle for the multiple PATH messages. Thus, a single LSP may be created for each channel, so that different physical links within the link bundle may be used to implement the multiple concatenated channels.

At an External Network to Network Interface (ENNI), where the route transitions from one domain into a neighboring domain, the route may not be explicit and need to be expanded. According to an embodiment of the invention, when a RSVP bundle message containing multiple PATH messages is received at a network element, such as an ENNI, where the route for the PATH messages needs to be expanded, the route is expanded collectively rather than individually. Specifically, the route will first be expanded as part of bundle message processing and this expanded route will be inserted into each individual PATH message. The modified PATH messages with the expanded route will then be passed through the RSVP process one at a time, resulting in the creation of a finite state machine for each PATH message, to enable resources to be reserved for the concatenated connection.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
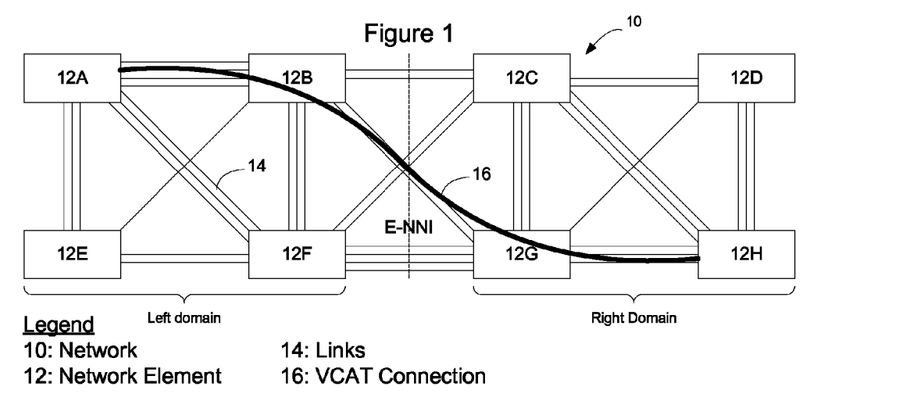
FIG. 1 is a functional block diagram of an example communication network showing a Virtual Concatenated (VCAT) connection to be signaled over the communication network.

FIG. 1 shows an example network 10 in which multiple network elements 12 are interconnected by links 14. Multiple links may extend between pairs of network elements. For ease of reference the network elements have been labeled 12A-12H. A VCAT connection 16 formed of multiple individual connections may be created across the network to enable data to be transmitted from network element 12A to network 12H. In the following description it will be assumed that the connection is calculated to extend through network elements 12A, 12B, 12G, 12H. The network elements in the illustrated network are separated into two domains, a left domain and a right domain which are separated by an External Network to Network Interface (E-NNI).

Figure 2:
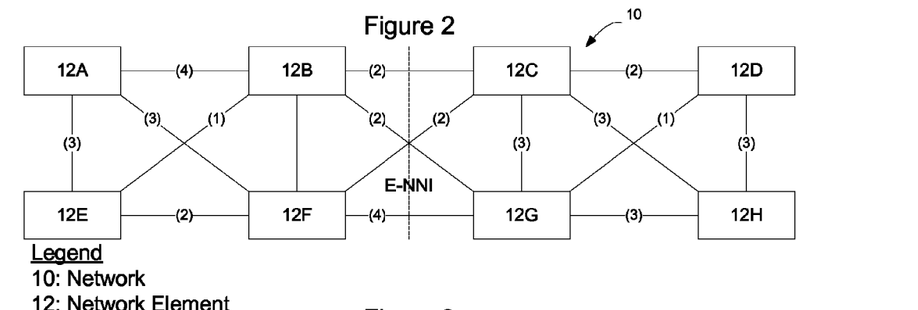
FIG. 2 is a routing view of the communication network of FIG. 1.

FIG. 2 shows a routing view of the network. As shown in FIG. 2, to increase scalability, equivalent links between nodes may be grouped and advertised collectively rather than individually. Accordingly, as shown in this example, the four links extending between network element 12A and 12B have been advertised as a single link. The numbers in parentheses on each link bundle indicate the number of physical links that are present in the example network shown in FIG. 1. A routing protocol such as Open Shortest Path First (OSPF) may be used to advertise routing information on the network. Other link state routing protocols such as Intermediate System to Intermediate System (IS-IS) may be used as well.

When a connection is to be implemented on the network, the head-end node will use its routing system to calculate a route for the connection. In this example, it will be assumed that the connection is to pass through network elements 12A, 12B, 12G, 12H.

Figure 3:
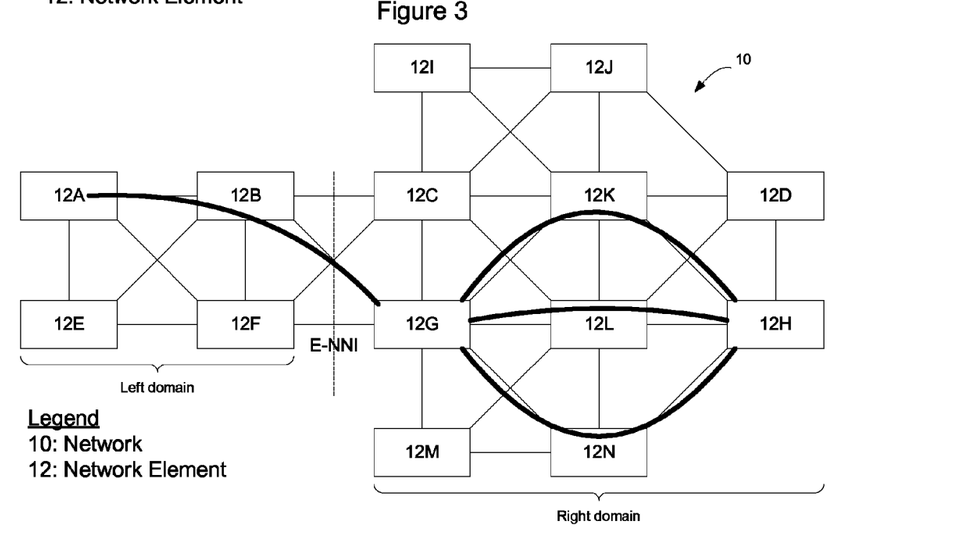
FIG. 3 is a functional block diagram of a VCAT connection in which the separate connections have been separately signaled and separately expanded at an E-NNI.

Routing information is generally abstracted and the abstractions are advertised across E-NNI boundaries. Hence, a node such as network element 12A will often have only an abstracted view of the adjacent domain. For example, as shown in FIG. 3, the right domain may have additional nodes and internal structure that is not visible to the head-end node. Thus, when the route passes across the E-NNI, the node on the E-NNI boundary will need to expand the route to include routing information for the new domain. Thus, when the network element 12G receives a signaling message to establish the connection, it will determine the best way to reach 12H within the right domain and supplement the routing information to enable the connection to be established through that domain.

FIG. 3 shows an example of what may happen if the E-NNI performs route expansion for each of the PATH messages of a VCAT separately. As shown in FIG. 3, assume that node 12G receives three separate PATH messages, all of which are to be connected through the right domain to node 12H. Node 12G may route one of the connections through intermediate node 12K, a second of the connections through intermediate node 12L, and a third of the connections through intermediate node 12N. Thus, the three connections are not guaranteed to be co-routed where route expansion happens separately for the different connections.

Figure 4:
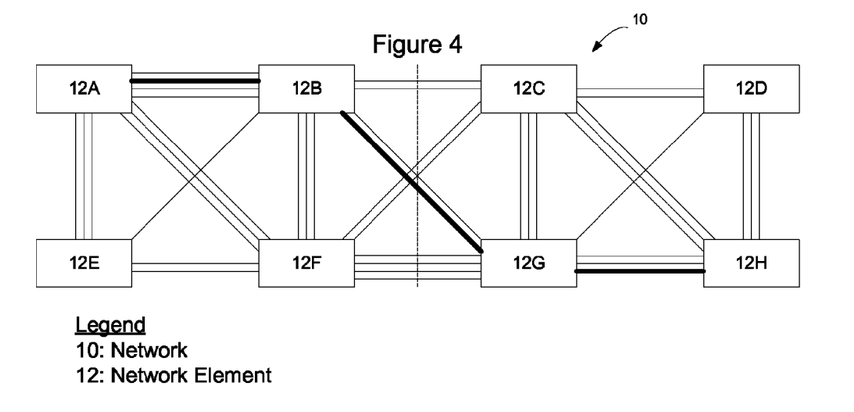
FIG. 4 is a functional block diagram of the connection that may be signaled across the communication network if standard RSVP signaling is used to signal the VCAT connection on the communication network.
Figure 5:
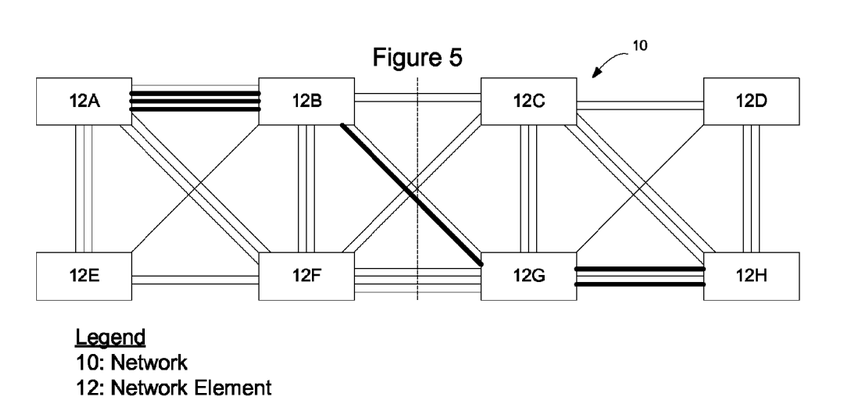
FIG. 5 is a functional block diagram of the VCAT connection that may be signaled across the communication network if RSVP bundle message containing multiple PATH messages is used to enable different connections of the VCAT connection to be co-routed through separate links of link bundles according to an embodiment of the invention.

One way to get around this problem is to use a single PATH message to signal all of the connections of the VCAT. FIG. 4 shows a connection that may be established on a communication network where a single PATH messages is used to set up the VCAT. As noted in the background, RSVP signaling causes a finite state machine to be established in the control plane of the network element and also causes forwarding information to be passed into the data plane of the network element. The control entity should have a one-to-one relationship with the data plane entry so that, upon a change in state of the data plane connection, the finite state machine may cause appropriate failover of the connection to occur. Accordingly, if a single RSVP PATH message is used to establish all the connections of the VCAT as per RFC 4606, only one physical link in each link bundle may be used to carry the connections. This is shown in FIG. 4, in which one of the 4 equivalent links between node 12A and 12B, one of the two equivalent links between node 12B and 12G, and one of the three equivalent links between node 12G and 12H have been used to establish the connection from node 12A to node 12H. This solves the multiple path issue highlighted in FIG. 3, but restricts the manner in which connections can be implemented on the network.

Where the connection is a VCAT connection, including more than one STS-1, STS-3c, etc., it would be nice to be able to use more than one of the physical links between the network elements. According to an embodiment of the invention, a RSVP bundle message may be used to co-signal VCAT connections and cause the connections to be processed as a group. This enables route expansion to be implemented identically for all connections to ensure that the connections are co-routed. This also allows the VCAT connection to be implemented on multiple physical links between network elements, where the multiple physical links are part of a link bundle. FIG. 5 shows a connection of this nature, in which the first leg of the connection between nodes 12A and 12B has been implemented on three physical links, the second leg of the connection from 12B-12G has been implemented on one physical link, and the third leg of the connection from 12G-12H has been implemented on two physical links.

According to an embodiment of the invention, a RSVP bundle message may be used to carry multiple PATH messages relating to a VCAT connection to be established on the network. For example, the VCAT connection may be formed from 21 STS-1s. In this instance, the RSVP bundle message would include 21 PATH messages—one PATH message for each of the STS-1s to be created on the network. Since there is one PATH message for each connection of the VCAT connection, a one-to-one association between finite state machines and data plane connections may be maintained within each network element.

Using a RSVP bundle message enables route expansion to be implemented for the group of PATH messages to ensure that each of the connections will follow the same route through the network. This enables the multiple components of the VCAT connection to all follow the same route through the network so that delay on each of the components will be approximately equal.

Figure 7:
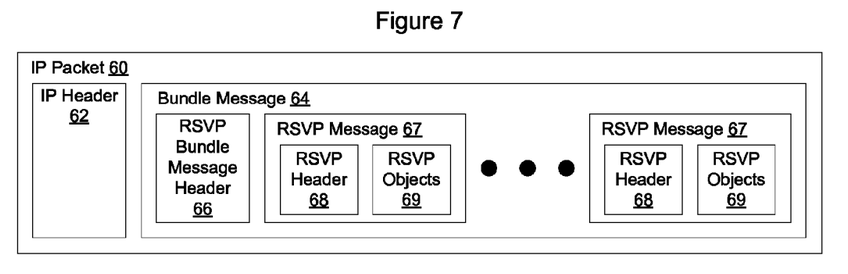
FIG. 7 is a block diagram of a RSVP bundle message containing multiple RSVP messages that are to be processed as a group according to an embodiment of the invention.

RSVP bundle messages are part of the RSVP standard and are specified in IETF RFC 2961. FIG. 7 shows an example RSVP Bundle message. As shown in FIG. 7, an RSVP bundle message may be carried in an IP packet 60 having an IP header 62. The RSVP bundle message 64 has a RSVP bundle message header 66. The bundle message also contains one or several individual RSVP messages 67, each of which will have its own RSVP header 68 and RSVP objects 69.

Figure 8:
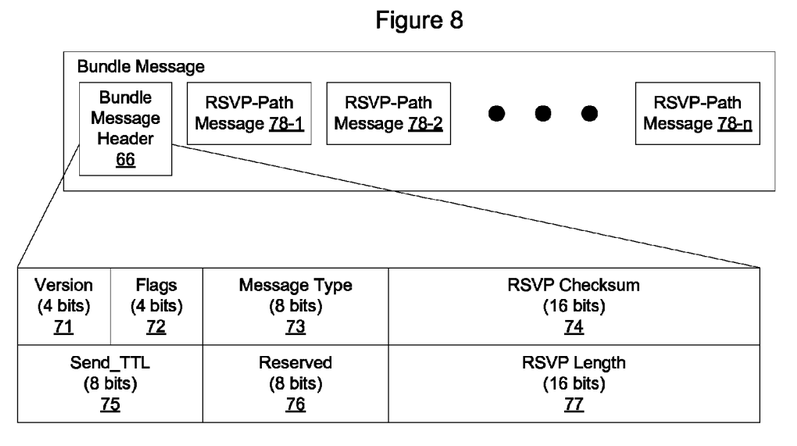
FIG. 8 is a block diagram of the RSVP bundle message of FIG. 6, in which the RSVP messages are PATH messages and showing the RSVP bundle message header in greater detail.

FIG. 8 shows an example of the RSVP message header in greater detail. As shown in FIG. 8, the RSVP bundle message header includes a 4 bit version field 71, a 4 bit flag field 72, an 8 bit message type field 73, a 16 bit RSVP checksum 74, an 8 bit Time To Live (TTL) field 75, an 8 bit reserved field 76, and a 16 bit RSVP length field 77. The RSVP bundle message may carry PATH messages 78-1 to 78-n or other types of RSVP messages.

Ordinarily, when a network element receives an RSVP bundle message it will extract the RSVP messages 67 from the RSVP bundle message 64 and process each RSVP message 67 individually as if it had been received on its own rather than as part of a bundle. Thus, normally, a RSVP bundle message is simply a convenient way to transport multiple RSVP messages and does not imply any association between the messages.

If a RSVP bundle message is used to carry multiple PATH messages for a co-routed VCAT connection, it is necessary to modify the RSVP bundle message slightly so that the PATH messages may be processed as a group rather than processed individually. Specifically, since it is necessary for the co-routed VCAT connections to be routed the same way through the network, where route expansion is required to be performed, the same route expansion should be implemented for each PATH message. Thus, the RSVP bundle message should be modified to instruct the node to perform route expansion for the group of messages so that a common route may be found for the group.

Connections in a VCAT also should either all be implemented or none of the connections should be implemented. To implement this restriction, the nodes may process the PATH messages contained in a RSVP bundle message in such a manner that they all must pass connection control at the network element or else they all should fail. Alternatively, the head-end node that initiated the VCAT connection on the network may watch for error messages from the related connections. Where the head-end node receives an error message indicating that establishment of at least one of the related connections has not been successful, the head-end node may then tear down the other related connections of the VCAT that were successfully implemented on the network. In this manner the head-end node may implement regular signaling processes to ensure that all of the concatenated connections of the VCAT are either all succeed or all fail.

As noted above, individual RSVP messages in a standard RSVP bundle message are conventionally processed individually. Accordingly, a standard RSVP bundle message cannot be used to carry co-routed VCAT PATH messages since the network elements would not know to implement this interdependency between the messages. Thus, using a standard RSVP bundle message to carry the co-routed VCAT PATH message would allow different routes to be assigned to the connections during the route expansion process.

According to an embodiment of the invention, a combination of flags 72, new message type 73, or the reserved bits 76 may be used to signal to the network element that the RSVP messages contained within the RSVP bundle message are co-routed VCAT PATH messages and should be processed as a group. The new RSVP bundle message type will enable the network element to be notified that the individual messages are to be processed as a group. This allows route expansion to be performed for all of the messages as a group to ensure that the connections will remain co-routed even where they pass across an administrative domain. Additionally, if desired, co-processing the PATH messages will allow the bundle message processing on the network element to enforce the all succeed or all fail rule described above so all of the components of the VCAT connection will either all pass connection control or all fail connection control. Alternatively, as noted above, where the nodes on the network are not able to implement this process, the head-end node may use signaling to tear down the successfully created connections where not all of the concatenated connections are able to be set up on the network.

Figure 6:
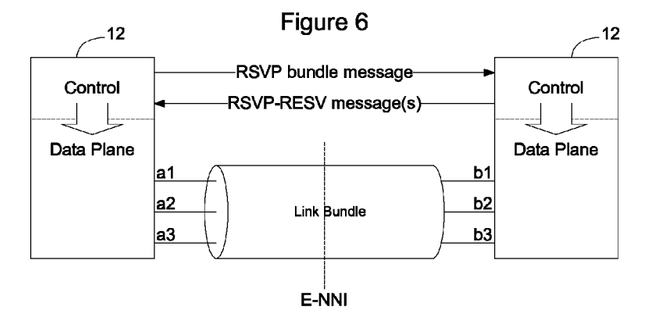
FIG. 6 is a functional block diagram showing the exchange of a RSVP bundle message containing multiple PATH messages across an E-NNI according to an embodiment of the invention.

FIG. 6 shows an ENNI boundary in a network. As described above, routing information typically is abstracted at ENNI boundaries. Thus, when a route passes across the ENNI boundary the route will need to be expanded to enable the route to traverse across the new domain. As shown in FIG. 6, when a PATH message is received it will be processed at the control plane. The control plane will perform connection control to ensure that there are sufficient resources to handle the new connection. If the PATH message passes connection control, the resources for the connection will be reserved by the control plane. Once the PATH message has reached its destination on the network and has passed connection control at each node along the path, a RESV message will be transmitted back along the route to cause each node on the route to program the resources it had reserved for the connection into its data plane to thereby enable the connection to be implemented through the network.

Figure 9:
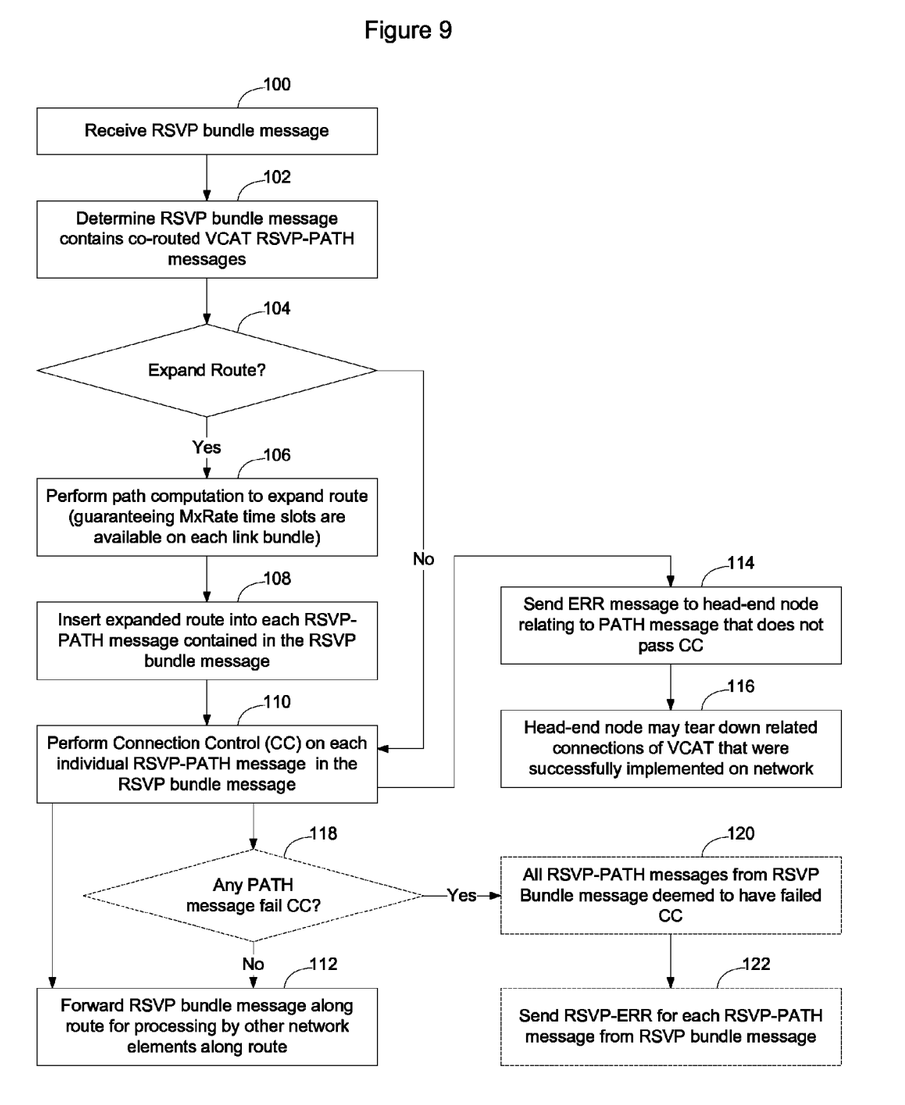
FIG. 9 is a flow diagram of a process of processing a RSVP bundle message according to an embodiment of the invention.

FIG. 9 shows a process that may be used to process groups of PATH messages associated with co-routed VCAT when the group of PATH messages is received in a RSVP bundle message. As shown in FIG. 9, when a network element receives a RSVP bundle message (100) it will read the flags field, message type field, or reserved bits of the reserved field to determine if the RSVP bundle message is being used to co-signal co-routed components associated with a VCAT connection (102). The particular field(s) that the network element reads will depend on the particular implementation.

If the RSVP bundle message is a co-routed VCAT message type, the network element will determine if it is necessary to expand the route (104). If so, a path computation will be performed for all PATH messages collectively (106). In this path computation process, the routing process will be used to determine the expanded route and will seek to find a route guaranteeing the full amount of bandwidth required, in the aggregate, by all PATH messages contained in the RSVP bundle message (106). Since the VCAT standard specifies that all concatenated connections are to be the same size, the routing process may simply multiply the number of connections (M=number of PATH messages) times the size (Rate=STS-1 or STS-3c) to determine how much bandwidth is required for the connection.

Once the expanded route has been determined, the expanded route will be inserted into each of the PATH messages contained in the RSVP bundle message (108). The PATH messages will then be passed to the RSVP Connection Control process (110). The PATH messages that pass connection control will be inserted into a RSVP Bundle message to be forwarded on the network (112).

If one of the PATH messages fails connection control, the RSVP process may send an error message to the head-end node (114). The head-end node may maintain an association between the PATH messages to guarantee that all of the connections either succeed or fail. Thus, when the head-end node receives an error message it may use RSVP signaling to tear down the other connections of the VCAT (116). Alternatively, the node may perform a check to determine whether any of the PATH messages has failed connection control (118). In this embodiment, if any one of the PATH messages fails connection control, all of the PATH messages from the RSVP bundle message will be deemed to have failed connection control (120). In this instance, the network element may generate an RSVP-ERR for each PATH message from the RSVP bundle message (122).

Figure 10:
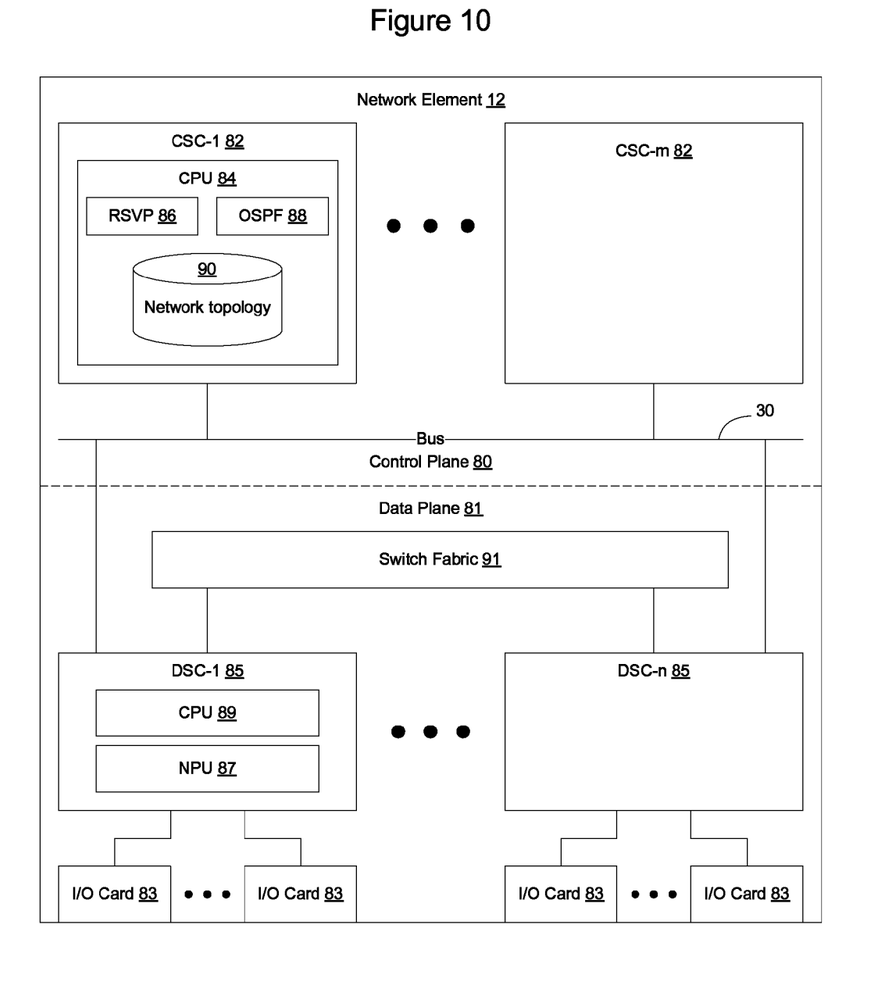
FIG. 10 is a functional block diagram of a network element that may be used to process multiple PATH messages as a group when received in a RSVP bundle message according to an embodiment of the invention.

FIG. 10 shows an example network element that may be used to implement an embodiment of the invention. FIG. 10 shows one possible network element architecture and the invention is not limited to implementation on a network element that is implemented in this manner. The invention is not limited to implementation on a network element implemented as shown in this Figure as other network elements may be used to implement the process described herein to enable multiple connections of a VCAT to be co-routed over different fibers of a link bundle.

In the embodiment shown in FIG. 10, the network element includes a control plane 80 and a data plane 81. The control plane 80, in this embodiment, includes one or more control service cards 82 containing processors 84. The processor will implement control logic to enable it to implement an RSVP process 86 and a routing process 88. The routing process has access to a network topology database 90 which it may access to perform route expansion as described above.

The RSVP process 86 may be implemented to process RSVP bundle messages as described above in connection with FIG. 7 to enable co-routed VCAT connections to be established over separate physical connections associated with a particular link bundle. The link bundle, in this context, is defined as a group of similar physical connections interconnecting the network element 12 with another common network element, and which also have similar delay and propagation characteristics.

The data plane 81 includes a plurality of input/output cards 83 which connect to physical links on the network. The data plane also includes one or more data service cards 85 containing a high speed network processing unit 87 to process data as it passes through the network element. Optionally a processor 89 may be provided to interface the data plane with the control plane so that the control plane may program resource reservations into the data plane. A switch fabric 91 provides non-blocking interconnectivity between input ports and output ports of the Input/output cards 83 and provides time slot interchange to enable connections to use any available time slot on the physical fibers connected to the network element.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of processing a set of related PATH messages to enable co-routed Virtual Concatenation (VCAT) connections to be implemented over multiple communication channels, each communication channel having a respective transmitter and a respective receiver, the method comprising:
    receiving a Reservation Protocol (RSVP) message;
    determining that the RSVP message indicates traffic specifications for co-routed VCAT connections; and
    processing the RSVP message to set up co-routed VCAT connections meeting the indicated traffic specifications.

2. The method of claim 1, wherein the RSVP message is a RSVP bundle message, the RSVP bundle message containing multiple PATH messages, each of the PATH messages being associated with one of the co-routed VCAT connections such that there is a one-to-one relationship between the PATH messages and the co-routed VCAT connections.

3. The method of claim 2, comprising:
    determining whether it is necessary to expand a route for at least one of the PATH messages; and
    if it is necessary to expand the route, performing route expansion to obtain an expanded route object for the PATH message and inserting the expanded route object into each of the multiple PATH messages.

4. The method of claim 3, wherein connection control is performed on a PATH message only after the expanded route object has been inserted into the PATH message.

5. The method of claim 2, wherein determining that the RSVP bundle message indicates traffic specifications for co-routed VCAT connections is performed by reading at least one flag of a RSVP bundle message header.

6. The method of claim 2, wherein determining that the RSVP bundle message indicates traffic specifications for co-routed VCAT connections is performed by reading a message type field contained in a RSVP bundle message header.

7. The method of claim 2, wherein determining that the RSVP bundle message indicates traffic specifications for co-routed VCAT connections is performed by reading a reserved field contained in a RSVP bundle message header.

8. The method of claim 2, comprising performing connection control separately for each PATH message.

9. The method of claim 8, wherein if one of the PATH messages fails connection control, the method comprises sending a message to a head-end node to indicate that one of the messages failed connection control.

10. The method of claim 8, wherein if any one of the PATH messages fails connection control, the method comprises causing all of the PATH messages to fail connection control even if some of the other PATH messages had previously individually passed connection control.

11. A network element, comprising:
    a plurality of transmitters, each transmitter being associated with a respective communication channel;
    an External Network to Network Interface adapted to process a RSVP message to enable co-routed Virtual Concatenation (VCAT) connections to be implemented over multiple communication channels by:
receiving a Reservation Protocol (RSVP) message;
determining that the RSVP message indicates traffic specifications for co-routed VCAT connections; and
processing the RSVP message to set up co-routed VCAT connections meeting the indicated traffic specifications.

12. The network element of claim 11, wherein the RSVP message is a RSVP bundle message, the RSVP bundle message containing multiple PATH messages, each of the PATH messages being associated with one of the co-routed VCAT connections such that there is a one-to-one relationship between the PATH messages and the co-routed VCAT connections.

13. The network element of claim 12, wherein the External Network to Network Interface is adapted to process the RSVP bundle message by:
determining whether it is necessary to expand a route for at least one of the PATH messages; and
if it is necessary to expand the route, performing route expansion to obtain an expanded route object for the PATH message and inserting the expanded route object into each of the multiple PATH messages.

14. The network element of claim 13, wherein performing connection control is performed on a PATH message only after the expanded route object has been inserted into the PATH message.

15. The network element of claim 12, wherein determining that the RSVP bundle message indicates traffic specifications for co-routed VCAT connections is performed by reading at least one flag of a RSVP bundle message header.

16. The network element of claim 12, wherein determining that the RSVP bundle message indicates traffic specifications for co-routed VCAT connections is performed by reading a message type field contained in a RSVP bundle message header.

17. The network element of claim 12, wherein determining that the RSVP bundle message indicates traffic specifications for co-routed VCAT connections is performed by reading a reserved field contained in a RSVP bundle message header.

18. The network element of claim 12, wherein the External Network to Network Interface is adapted to process the set of related PATH messages by performing connection control separately for each PATH message.

19. The network element of claim 18, wherein if one of the PATH messages fails connection control, the External Network to Network Interface sends a message to a head-end node to indicate that one of the messages failed connection control.

20. The network element of claim 18, wherein if any one of the PATH messages fails connection control, the External Network to Network Interface causes all of the PATH messages to fail connection control even if some of the other PATH messages had previously individually passed connection control.

* * * * *